Jan. 22, 1957 J. L. F. ROSS 2,778,456
DISK TYPE BRAKE
Filed April 22, 1953
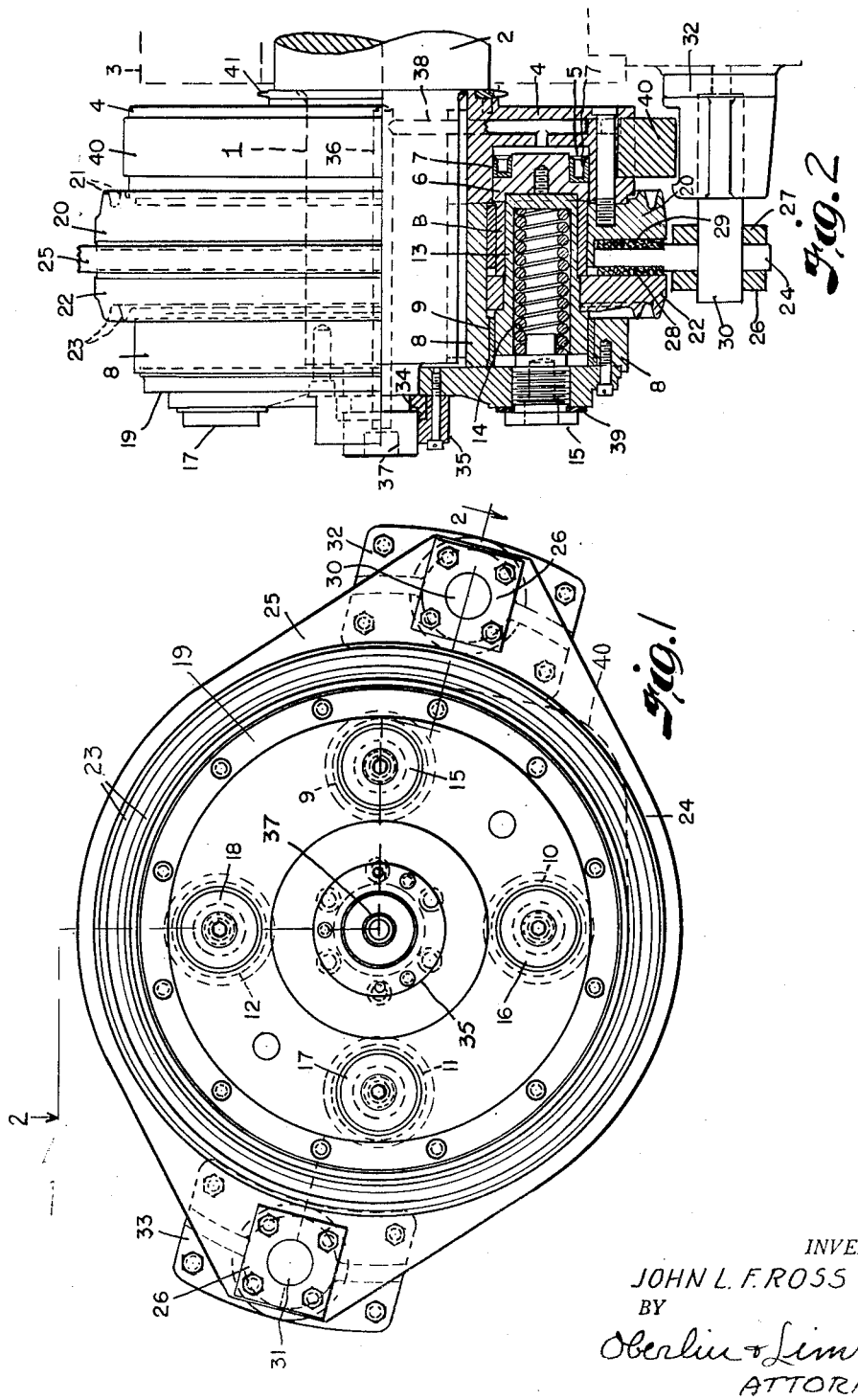
INVENTOR.
JOHN L. F. ROSS
BY
Oberlin + Limbach
ATTORNEYS.

United States Patent Office 2,778,456
Patented Jan. 22, 1957

2,778,456

DISK TYPE BRAKE

John L. F. Ross, Cleveland, Ohio, assignor to The Ajax Manufacturing Company, Euclid, Ohio, a corporation of Ohio Application April 22, 1953, Serial No. 350,440

12 Claims. (Cl. 188—170)

This invention relates as indicated to a disk type friction brake, and more particularly to a spring set, air-released brake designed for use on forging presses and the like adapted to be actuated to stop the heavy moving parts after one cycle of operation.

In machines of this character the die carrying ram or slide is customarily driven by a crankshaft which in turn is driven by large and heavy intermittently operated rotary driving mechanism. Such rotary mechanism is in turn driven by a continuously rotating flywheel or similar inertia member to which it may intermittently be connected and disconnected by means of a suitable clutch. A machine of this general type is illustrated in Fig. 5 of Patent No. 2,141,951 to W. W. Criley. Other types of machines where my new brake is especially useful include upsetters, punch presses, power shears, sheet metal presses, forging hammers and roll forging machines (see, for example, W. W. Criley Patent No. 2,130,069). While particularly suitable for use with heavy single-cycle machines of the general type indicated, my new brake may also be utilized as a safety brake for railway cars, for steam shovels, or indeed for nearly any heavy machine having rotating parts of high inertia which it is desired to stop.

Many brakes employed in the past for similar purposes have been quite complicated of design and construction, and this has rendered them not only expensive but also difficult to maintain in good working order. A long delay required for the changing of worn friction surfaces may result in keeping a high production machine out of operation and seriously interfering with a production schedule.

It is accordingly a principal object of my invention to provide a very powerful and efficient disk type brake which may be relatively quickly disassembled for replacement of the friction surfaces.

A further object is to provide such a brake which will be adjustable in a simple manner.

Still another object is to provide such brake having opposed rotatable pressure members adapted to engage a fixed friction member therebetween, and resilient means operative normally to urge such pressure members toward one another and also interconnecting such members for rotation together as a unit.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is an end elevational view of my new brake assembly; and

Fig. 2 is a side elevational view thereof partly broken away on the line 2—2 on Fig. 1 to disclose the inner mechanism.

Referring now more particularly to said drawing, my new brake assembly is adapted to be mounted on the reduced end portion 1 of drive shaft or counter shaft 2 journalled in the main frame of a forging press, for example, generally indicated at 3. Keyed to such reduced portion 1 of shaft 2 is an annular cylinder 4 having an annular channel 5 therein encircling the end of the shaft. A piston 6 in the form of a ring is fitted in such channel for reciprocation axially of shaft 2 and provided with molded packing cups such as 7.

Also keyed to reduced end portion 1 of shaft 2 for rotation with such shaft and member 4 is a body member 8 having a plurality (in this case four) of guide bushings 9, 10, 11 and 12 pressed therein parallel to the axis of shaft 2. Fitted for reciprocation therein are four spring plungers such as 13 fitting freely in sockets in annular piston 6 for reciprocation therewith and hollowed to receive compression springs such as 14 therewithin adapted to bear against the inner ends of adjustable screw plugs 15, 16, 17 and 18 threaded in end plate 19 bolted to member 8.

Inner brake plate 20 provided with ventilating ribs 21 on its non-operating surface is bolted and doweled to annular cylinder member 4 for rotation therewith and accordingly with shaft 2. Outer brake plate 22 provided with ventilating ribs 23 on its non-operating surface is bored for a sliding fit on member 8 and is also bored with four holes therethrough to receive the spring plungers 13 tightly press fitted therein for reciprocation therewith. Consequently, brake plate 22 will be moved in and out with reciprocation of piston 6 and spacer bushing B, but springs 14 will tend to urge such spring plungers and accordingly brake plate 22 to the right as viewed in Fig. 2 of the drawing. The spring plungers are press fitted in bushing B which makes a sliding fit in stationary inner brake plate 20.

An annular friction plate cast in two halves 24, 25 which are joined at their opposed ends by plates 26, 27, securely bolted, is faced on both sides with suitable friction material 28 and 29 riveted thereto. This separable friction plate or ring 24, 25 floats on studs 30 and 31 mounted in brackets 32 and 33 bolted to the press frame 3 at points spaced 180° about shaft 2. Consequently, when brake plate 22 is caused to move to the right as viewed in Fig. 2, it will engage the friction material 28 of friction plate 24, 25 and also move such plate to the right to force friction material 29 against brake plate 20. The frictional braking action thus obtained in a circumferential region well spaced outwardly from shaft 22 is effective promptly to bring rotation of such shaft to a stop.

A thrust ring 34 cut in two halves is set in a groove near the outer end of shaft 2 and retained in place by annular retainer cap 35 bolted to end plate 19. Shaft 2 is drilled axially at 36 opening to the outer end of the shaft and there provided with means for connection with an air supply line at 37. Passages such as 38 radiate from passage 36 to annular cylinder or channel 5 (ordinarily three or four such passages 38 may be provided) so that air pressure may be introduced thereto effective to overcome the action of the springs 14 to shift piston 6, spacer bushings B, spring plungers 13 and thereby brake plate 22 away from brake plate 20, releasing the frictional engagement with the friction surfaces of friction plate 24, 25. When air is thus applied behind piston 6, the spring plungers, outer brake plate 22, spacer bushing B, and piston 6 itself will move as a unit a distance sufficient to release the brake, ordinarily only about one-eighth inch. It is important to note that excellent alignment and guidance is obtained through the large diameters of the outer ends of the spring plungers sliding in bushings 9, etc., and the fact that large spacer bushing B slides in inner brake plate 20.

To replace worn friction facings 28 and 29 on friction plate 24, 25, the brake is first released by means of air pressure admitted to annular air cylinder 5, whereupon the end plates 26, 27 may be unbolted and the friction plates 24, 25 withdrawn radially laterally from the assembly. The friction plates may then be re-faced with new friction material and reassembled in place. By this arrangement it will be seen that the brake may be maintained with a minimum of down time and with no disassembly of the remainder of the brake mechanism.

Since the extreme ends of spring plungers 13 enter shallow depressions or sockets in annular piston 6, such latter piston is prevented from spinning in channel or cylinder 5 relative to the brake plates 20 and 22. In fact, the entire brake mechanism with the exception of friction plate 24 which is anchored to the press frame is caused to rotate with shaft 2 at all times, and the parts of such mechanism are held against relative rotation. The spring plungers 13, being well supported and guided at each end, also serve as the driving pins for the outer brake plate 22, the inner brake plate 20 being driven through bolts and dowels into member 4 which in turn is keyed to shaft 2 as above described. Brake plate 22 can only move axially with regard to the remainder of the brake mechanism mounted on shaft 2.

The compression springs 14 in hollow spring plungers 13 are compressed by means of the spring adjusting plugs such as 15, and the position of such plugs may be varied by selected washers such as 39 so that the combined spring pressures will be sufficient to stop rotation of the shaft at a desired predetermined point. Of course, air pressure will be released from cylinder 5 considerably before the shaft has rotated to the position where it is desired to stop the same to allow a sufficient braking interval. It will be seen that broken springs, should these occur, may readily be replaced simply by removing the spring adjusting plugs such as 15 without the necessity of dismantling any other part of the brake assembly. As the friction material 28, 29 wears, there will obviously result a somewhat increased degree of reciprocation of brake plate 22 and its associated plungers.

The brake mechanism of my invention also serves as a convenient mounting for a cam 40 conventionally employed to operate the bottom knock-out mechanism of the forging press. A chain sprocket 41 may also be secured to the inner end of the mechanism for rotation with shaft 2 to drive a timer adapted to control the proper timing of both the brake release and the usual clutch engaging means (not shown). Of course, generally similar timer drive mechanism is conventional for this purpose and does not constitute a part of the present invention.

It will now be seen that I have provided brake mechanism especially suited for the frequent stopping of rotary elements of large machines having high inertia or angular momentum. The principal parts of my brake mechanism are of rugged construction ensuring long life while those parts such as the friction surfaces and springs which are necessarily subjected to rough usage in the ordinary operation of a one-cycle machine may readily be replaced with a minimum of down time. The disassembly of the main brake mechanism is avoided and relatively unskilled personnel are capable of keeping the same in good working order. Since brake plate 22 is driven through a plurality of spring plungers 13 spaced radially outwardly from shaft 2, an effective driving torque is obtained despite the fact that such relatively thin plate must be mounted for a degree of axial reciprocation.

Other modes of applying the principle of the invention may be employed, change being made as regards the details described, provided the features stated in any of the following claims, or the equivalent of such, be employed.

I therefore particularly point out and distinctly claim as my invention:

1. A brake assembly adapted frictionally to control rotation of a shaft, comprising an annular cylinder adapted to be mounted on such shaft concentrically therewith adjacent one end and to partake of the rotation of such shaft, a piston fitted in said cylinder for reciprocation axially of such shaft, an inner brake plate attached to said cylinder for rotation therewith, an outer brake plate movable axially toward and away from said inner brake plate, said brake plates being disposed in planes normal to the axis of such shaft, an annular friction plate disposed between said brake plates adapted to be engaged by said outer brake plate and moved thereby into engagement with said inner brake plate, said friction plate being formed of two separable sections to permit the same to be withdrawn radially from such shaft, means adapted to lock said friction plate against rotation in operative position, a plurality of spring plungers in the form of substantially cylindrical casings arranged in circumferentially spaced apart relation to such shaft and extending axially through said outer and inner brake plates, thereby to drive said outer brake plate in response to rotation of said inner brake plate with said shaft, said plungers being engaged at their inner ends in sockets formed in said piston, said plungers further being tightly engaged in said outer brake plate and reciprocably received in said inner brake plate, compression springs in said plungers operative to urge said outer brake plate inwardly, thereby normally to maintain said brake plates and said friction plate in braking engagement, an end plate adapted to be readily mounted on and removed from such shaft provided with means operative adjustably to engage said springs to regulate the pressure exerted thereby, and fluid pressure means operative, when actuated, to force said piston outwardly against the action of said springs to disengage said brake plates and said friction plate.

2. A brake assembly adapted frictionally to control rotation of a shaft, comprising an annular cylinder adapted to be mounted on such shaft concentrically therewith adjacent one end and to partake of the rotation of such shaft, a piston fitted in said cylinder for reciprocation axially of such shaft, an inner brake plate attached to said cylinder for rotation therewith, an outer brake plate movable axially toward and away from said inner brake plate, said brake plates being disposed in planes normal to the axis of such shaft, an annular friction plate disposed between said brake plates adapted to be engaged by said outer brake plate and moved thereby into engagement with said inner brake plate, said friction plate being formed of two separable sections to permit the same to be withdrawn radially from such shaft, means adapted to lock said friction plate against rotation in operative position, a plurality of spring plungers arranged in circumferentially spaced apart relation to such shaft and extending axially through said outer and inner brake plates, said plungers being engaged at their inner ends in sockets formed in said piston, said plungers further being tightly engaged in said outer brake plate and snugly but reciprocably received in said inner brake plate, the outer brake plate thereby being driven by the plungers and inner brake plate in response to rotation of the latter with said shaft, compression springs in said plungers operative to urge said outer brake plate inwardly, thereby normally to maintain said brake plates and said friction plate in braking engagement, adjusting means operative to regulate the pressure exerted by said springs, and fluid pressure means operative, when actuated, to force said piston outwardly against the action of said springs to disengage said brake plates and said friction plate.

3. A brake assembly adapted frictionally to control rotation of a shaft, comprising an annular cylinder adapted to be mounted on such shaft concentrically therewith adjacent one end and to partake of the rotation of such shaft, a piston fitted in said cylinder for reciprocation axially of such shaft, an inner brake plate attached to said cylinder for rotation therewith, an outer brake plate movable axially toward and away from said inner brake plate, said brake plates being disposed in planes normal to the axis of such shaft, an annular friction plate disposed between said brake plates adapted to be engaged by said outer brake plate and moved thereby into engagement with said inner brake plate, said friction plate being formed of two separable sections to permit the same to be withdrawn radially from such shaft, means adapted to lock said friction plate against rotation in operative position, a plurality of spring plungers arranged in circumferentially spaced apart relation to such shaft extending axially through said outer and inner brake plates and being engaged at their inner ends in sockets formed in said piston, said plungers being tightly engaged in said outer brake plate and snugly but reciprocably received in said inner brake plate, the outer brake plate thereby being driven by the plungers and inner brake plate in response to rotation of the latter with said shaft, compression springs in said plungers operative to urge said outer brake plate inwardly, thereby normally to maintain said brake plates and said friction plate in braking engagement, and fluid pressure means operative, when actuated, to force said piston outwardly against the action of said springs to disengage said brake plates and said friction plate.

4. A brake assembly adapted frictionally to control rotation of a shaft, comprising an annular cylinder adapted to be mounted on such shaft concentrically therewith to partake of the rotation thereof, a piston fitted in said cylinder for reciprocation axially of such shaft, an inner brake plate attached to said cylinder for rotation therewith, an outer brake plate movable axially toward and away from said inner brake plate, said brake plates being disposed in planes normal to the axis of such shaft, an annular friction plate disposed between said brake plates adapted to be engaged by said outer brake plate and moved thereby into engagement with said inner brake plate, said friction plate being formed of two separable sections to permit the same to be withdrawn radially from such shaft, means adapted to lock said friction plate against rotation in operative position, a plurality of spring plungers arranged in circumferentially spaced apart relation to such shaft extending axially through said outer and inner brake plates and engaging said piston, said plungers being tightly engaged in said outer brake plate and snugly but reciprocably received in said inner brake plate, the outer brake plate thereby being driven by the plungers and inner brake plate in response to rotation of the latter with said shaft, compression springs in said plungers operative to urge said outer brake plate inwardly, thereby normally to maintain said brake plates and said friction plate in braking engagement, and fluid pressure means operative, when actuated, to force said piston outwardly against the action of said springs to disengage said brake plates and said friction plate.

5. A brake assembly adapted frictionally to control rotation of a shaft, comprising an annular cylinder adapted to be mounted on such shaft to partake of the rotation thereof, a piston fitted in said cylinder for reciprocation axially of such shaft, a first brake plate attached to said cylinder for rotation therewith, a second brake plate movable axially toward and away from said first brake plate, an annular friction plate disposed between such brake plates adapted to be engaged by said second brake plate and moved thereby into engagement with said first brake plate, means operative to lock said friction plate against rotation, a plurality of spring plungers extending axially through such brake plates and engaging said piston operative to drive said second brake plate in response to rotation of said first brake plate with said cylinder, said plungers being tightly engaged in said second brake plate and snugly but reciprocably received in said first brake plate, compression springs in said plungers operative to urge such brake plates and said friction plate into braking engagement, and fluid pressure means operative, when actuated, to disengage such brake plates and said friction plate.

6. A friction brake adapted to control rotation of a shaft, comprising inner and outer brake plates adapted to fit about such shaft adjacent a free end thereof and to rotate therewith, a non-rotating annular friction plate adapted to encircle such shaft intermediate said brake plates, said friction plate being formed of plural separable segments to permit radial withdrawal thereof from such shaft, a plurality of spring plungers in the form of casings having open outer ends, said plungers extending axially through said brake plates rotatively to lock the same, end closure means adapted to be readily removably mounted on the adjacent end of such shaft thereby to overlie such open outer ends of such casings, and compression springs in said plungers acting against said end closure means operative to urge said brake plates and said friction plate into frictional braking engagement, said springs being exposed by removal of said end closure means, whereby they may be removed without disassembly of such plates from such shaft.

7. In a brake, a stationary brake plate, a movable brake plate adapted to reciprocate relative to said stationary brake plate, a plurality of spring assemblies operative to urge such brake plates together, said spring assemblies being attached to said movable brake plate for reciprocation therewith and snugly but slidably passing through said stationary brake plate, and fluid pressure means including an annular piston engaging the ends of said spring assemblies operative to move the same to force such plates apart.

8. In a brake, a stationary brake plate, a movable brake plate adapted to reciprocate relative to said stationary brake plate, a friction plate disposed between such brake plates adapted to be engaged by said movable brake plate and moved thereby into engagement with said stationary brake plate, a plurality of spring plungers extending axially through such brake plates, said plungers being attached to said movable brake plate for reciprocation therewith and slidably passing through said stationary brake plate, compression springs in said plungers operative to urge such brake plates and said friction plate into braking engagement, a piston disposed at the side of said stationary brake plate remote from said movable brake plate and having sockets within which the ends of said spring plungers are engaged, and fluid pressure means operative, when actuated, to move said piston to disengage such brake plates and said friction plate.

9. An annular brake assembly adapted to be mounted on a shaft to be braked, comprising a first annular brake plate adapted to be keyed to such shaft and held against axial movement thereon in a plane normal to the axis of such shaft, a second annular brake plate mounted for reciprocation toward and away from said first brake plate, an annular friction member interposed between said first and second brake plates and held against rotation, spring means urging said second brake plate toward said first brake plate to clamp said friction member therebetween, fluid pressure means operative to move said second brake plate away from said first brake plate to release the braking action, and a plurality of circularly spaced-apart axially extending drive members interengaging said first and second brake plates and said fluid pressure means for rotation together.

10. An annular brake assembly adapted to be mounted on a shaft to be braked, comprising a first annular brake plate adapted to be keyed on such shaft and held against axial movement thereon in a plane normal to the axis of such shaft, a second annular brake plate mounted for reciprocation toward and away from said first brake plate, an annular friction member interposed between said first and second brake plates and held against rotation, compression springs urging said second brake plate toward said first brake plate to clamp said friction member therebetween, guide means movable with said second brake plate and extending axially through said first brake plate, and fluid pressure means engaging said guide means at the side of said first brake plate remote from said second brake plate operative, when actuated, to further compress said springs to release the braking action.

11. A brake for a rotatable body comprising a friction plate, a brake plate at one side of said friction plate, means for securing one of such plates to said body for rotation therewith, means for holding the other of such plates against rotation, a second brake plate at the opposite side of said friction plate, the brake and friction plates being mounted for limited relative movement frictionally to engage and to release the same, a plurality of plungers of substantial diameter extending axially through the brake plates to key the two rotatively, said plungers being connected with one brake plate to move therewith and passing through the other brake plate in close sliding fits, compression springs in said plungers, and stop means on said body in engagement with the outer ends of said springs, the latter urging the brake and friction plates into braking engagement.

12. The brake of claim 11 including fluid pressure means for opposing the action of said springs to release the brake and friction plates from such braking engagement.

References Cited in the file of this patent

UNITED STATES PATENTS

| | | |
|---|---|---|
| 1,913,802 | Gregory | June 13, 1933 |
| 2,108,059 | Glasner | Feb. 15, 1938 |
| 2,180,218 | Wissman | Nov. 14, 1939 |
| 2,252,906 | Williamson | Aug. 19, 1941 |
| 2,453,945 | Spase | Nov. 16, 1948 |
| 2,505,600 | Wissman | Apr. 25, 1950 |
| 2,610,719 | Hornbostel | Sept. 16, 1952 |